Figure 1:
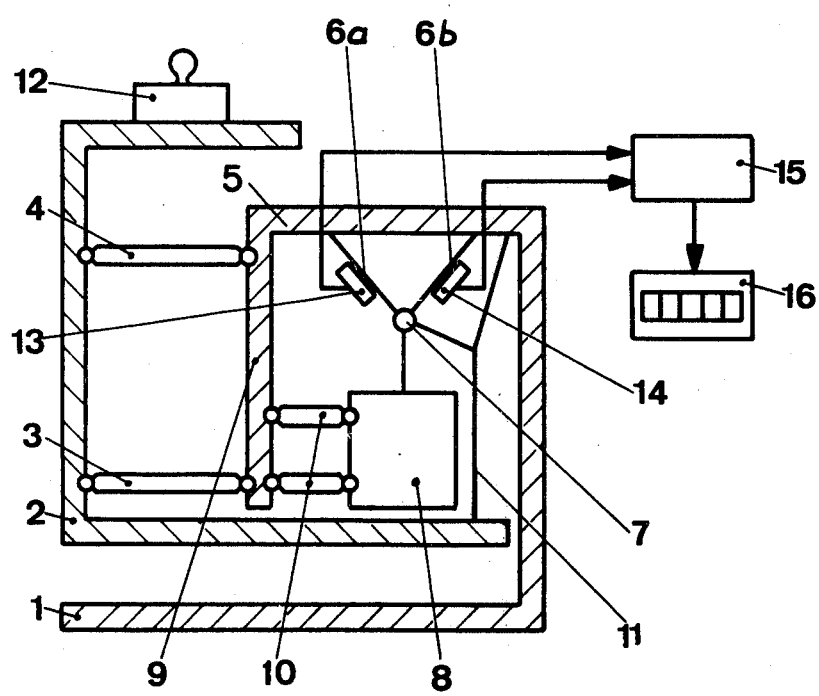

United States Patent [19]
Melcher et al.

[11] 3,885,427
[45] May 27, 1975

[54] ELECTRONIC BALANCE FOR MEASURING MASSES OR FORCES

[75] Inventors: Domenic Melcher, Uster; Mario Gallo, Zurich, both of Switzerland

[73] Assignee: Wirth, Gallo and Company, Zurich, Switzerland

[22] Filed: Aug. 22, 1972

[21] Appl. No.: 282,867

[30] Foreign Application Priority Data
May 16, 1972   Switzerland.......................... 7287/72

[52] U.S. Cl............. 73/141 R; 73/DIG. 1; 177/210
[51] Int. Cl.............................. G01l 1/10; G01g 3/16
[58] Field of Search...... 73/DIG. 1, 517 AV, 141 R; 324/79 D, 140 D; 235/92 WT, 92 FQ, 150.3, 151.33; 177/210

[56] References Cited
UNITED STATES PATENTS

| | | |
|---|---|---|
| 2,912,861 | 11/1959 | Coyne et al............. 73/517 AV UX |
| 3,062,052 | 11/1962 | Kolb.............................. 73/DIG. 1 |
| 3,423,999 | 1/1969 | Wirth et al....................... 73/141 R |
| 3,546,943 | 12/1970 | Wing............................. 73/517 AV |
| 3,583,225 | 6/1971 | Wing......................... 73/517 AV X |
| 3,712,395 | 1/1973 | Streater et al. .............. 73/DIG. 1 X |

Primary Examiner—Charles A. Ruehl
Attorney, Agent, or Firm—Stevens, Davis, Miller & Mosher

[57] ABSTRACT

A balance for measuring masses and forces comprising a phase-locked frequency multiplier which multiplies the string frequency $F_1$ that is raised by the process of measurement with a predetermined fixed factor in such manner that the multiplied frequency retains a constant phase relationship with the original frequency and wherein the number of full cycles of the multiplied frequency $F_1$ is counted for a period of time corresponding to a given number of full cycles of the frequency $F_2$, which frequency is reduced by the measuring process.

1 Claim, 2 Drawing Figures

ELECTRONIC BALANCE FOR MEASURING MASSES OR FORCES

The present invention relates to an electronic balance for measuring masses or forces, comprising a computing instrument and display means, such as visual indicating or printing means, wherein the load indirectly and differentially varies the tension of two pretensioned transversely vibrating electronically excited strings and the resultant frequency variations are used for calculating the load in the computing instrument and then displaying the same. Balances of the described kind for measuring masses or forces have been described for instance in Swiss Patent Specification Nos. 447,653 and 492,961 and in U.S. Pat. No. 3,423,999. If such an instrument functions according to the formula $$\frac{F_1}{F_2} \cdot C_1 - C_2 = R$$

where $F_1$ is the frequency of the string $S_1$ whose tension is increased, $F_2$ is the frequency of the string $S_2$ whose tension is decreased, $R$ is the result of the measurement, and $C_1$, $C_2$ are constant integers, then $R$ will be an integer only if $$\frac{F_1}{F_2} \cdot C_1$$

is an integer.

Since the computing instrument is a digital device only integers can be measured, processed and indicated. The result $R$ of a measurement will therefore merely be indicated to the nearest integer whenever the magnitude of the load is not in fact represented by an integral number. If $d$ is the smallest digital unit that can be indicated, then the indicated number must be construed as meaning $R \pm d/2$, always assuming that the balance has been precisely zeroed. Should this not be the case and zeroing be accurate only to within $d/2$, then the inaccuracy introduced by the zeroing error and that inherent in the result will in combination be as high as $R \pm d$.

Obviously the accuracy of balance, in which the wanted quantity is calculated by reference to a frequency ratio $F_1/F_2$ in terms of digital units $d$ and the result $R$ is indicated in the same digital units $d$, must be less than might be expected from the indicating accuracy $d$ because the magnitude of the scatter of the transitions caused by the computing instrument is already in the order of $d$. In order to achieve the indicated accuracy in such manner that both the zero point of the balance and the measured result $R$ can be determined within a fraction of an indicating unit $d$, the digital units used in the computing instrument must be smaller than $d$. For instance, the constants $C_1$ and $C_2$ and hence the measuring time would have to be increased to permit a sufficient number of full cycles of the frequency $F_1$ to be obtained during a given number of full cycles of the frequency $F_2$, or at least one of the two measuring strings would have to vibrate at a frequency that is several times higher, a requirement that would be difficult to achieve in the present state of the art.

It is the object of the present invention to improve the measuring accuracy of such a balance without unduly increasing the measuring time so that the inaccuracy of zeroing in conjunction with that of the result $R$ can be reduced to a fraction of an indicating unit $d$.

The proposed balance for measuring masses and forces is characterized in that it comprises a phase-locked frequency multiplier which multiplies the string frequency $F_1$ that is raised by the process of measurement with a predetermined fixed factor in such manner that the multiplied frequency retains a constant phase relationship with the original frequency and in that for determining the said quantity the number of full cycles of the multiplied frequency $F_1$ is counted for a period of time corresponding to a given number of full cycles of the frequency $F_2$ that is reduced by the measuring process.

Figure 2:
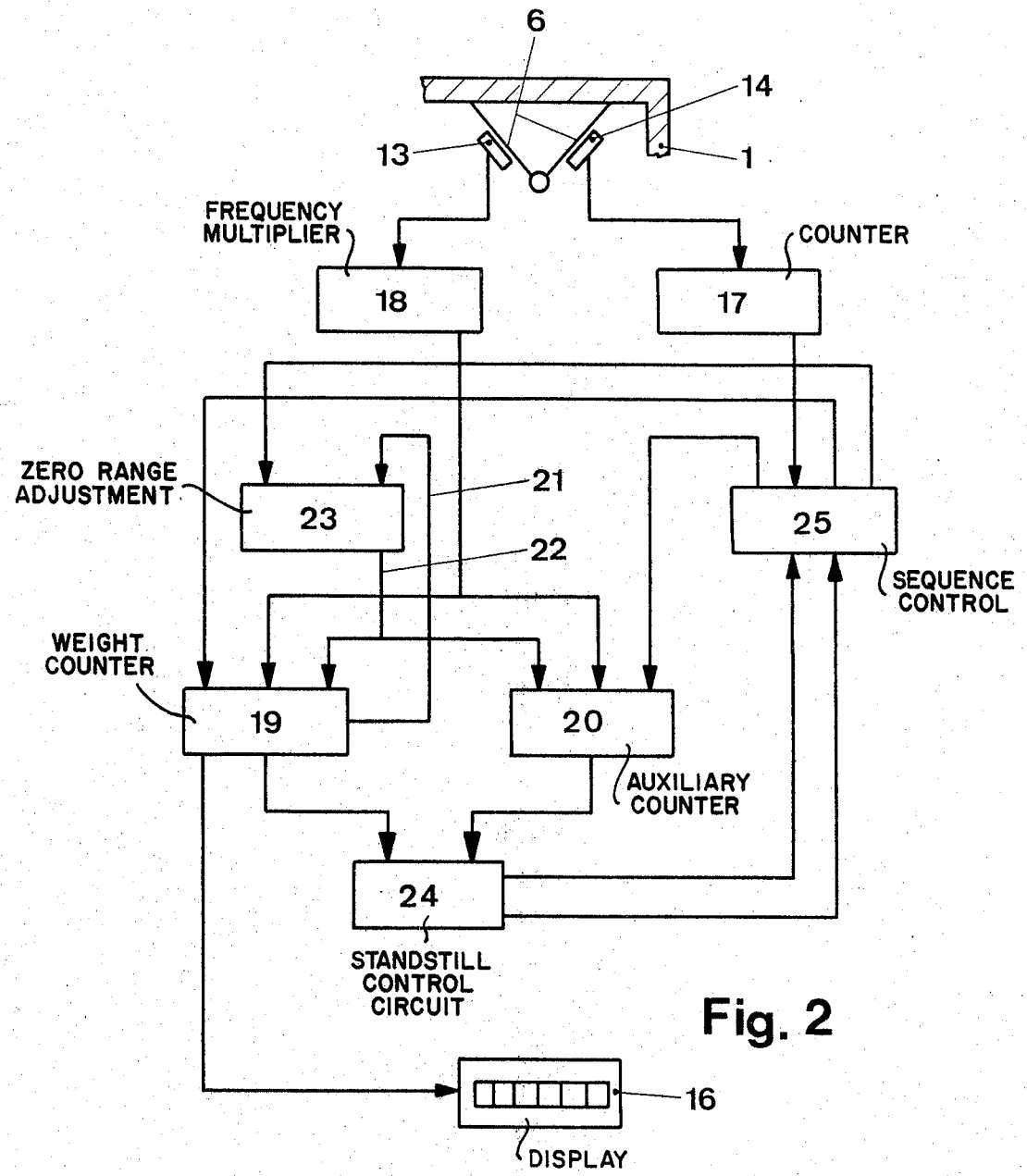

An embodiment of the subject matter of the invention is schematically shown in the accompanying drawing in which FIG. 1 is a balance for weighing mass and FIG. 2 is a portion of its associated evaluating means.

The balance illustrated in FIG. 1 comprises a frame 1 and a platform 2 for the load that is to be measured. This platform 2 is guided parallel to itself by two lever arms 3 and 4 pivoted to the frame 1. Attached in a Vee configuration to a part 5 of the frame 1 are two transversely vibrating strings 6a and 6b. The bottom ends of both strings are fastened to a body 7. A mass 8 is guided parallel to itself by lever arms 10 pivoted to a part 9 of the frame 1. This mass is suspended from the body 7 and thus serves to pre-tension the strings 6. The platform 2 is attached by a wire suspension 11 to part 5 of the frame as well as to the body 7. This known arrangement functions to apply to the strings 6a and 6b a force that is proportional to the weight of the mass of the load 12 that is to be measured. Moreover, the frame 1 carries two transducers respectively pick-offs 13, 14 which are electrically connected to a computing instrument 15. In conventional manner this computing instrument 15 serves to compare the frequencies of the two strings 6a and 6b which are equally pre-tensioned by the weight of the known mass 8 and differentially tensioned through the wire suspension 11 and the body 7 by the weight of the mass of the load 12 that is to be determined. In the illustrated embodiment the tension of the string 6a is raised by the load 12, whereas the tension of the string 6b, by virtue of the configuration of the wire suspension 11, is reduced. From a comparison of these frequencies the magnitude of the mass of the load 12 is calculated in a manner which as such is well understood and the result is indicated by display means 16.

What happens in the computing instrument 15 will now be more particularly described with reference to the block diagram of FIG. 2. The frequency $F_2$ which is transmitted by the pick-off 14 is applied to a first counter 17. On the other hand, the frequency $F_1$ which is transmitted by the pick-off 13 is applied to a phase-locked frequency multiplier 18 which applies the multiplied frequency to a weight counter 19 and to an auxiliary counter 20. The output of the weight counter 19 is applied through a connection 21 to the input of a circuit 23 which serves for automatically adjusting the zero range of the balance. The zero range is generally understood to be the range within which the balance measures masses between 0.0 $d$ and 0.9 $d$. The output of the circuit 23 is applied through a further connection 22 to both counters 19 and 20.

The outputs of both counters are connected through an interposed standstill control circuit 24 to a sequence control unit 25.

The standstill control circuit 24 permits an indication to be displayed only when the load 12 is "steady," i.e. when a comparison between two consecutive weighings gives an absolute difference less than 0.1 $d$. The counter 17 counts a predetermined fixed number of cycles of the frequency $F_2$. This predetermined number of cycles controls the measuring time during which full cycles of the multiplied frequency $F_1$ are counted in the counters 19 and 20. The sequence control unit 25 generates all the signals required by other elements of the computing instrument for the carrying out of the measurements.

If in the absence of the frequency multiplier 18 the frequency $F_1$ were directly applied to the weight counter 19 and to the auxiliary counter 20, the desired accuracy of the installation would necessitate excessively long measuring times. With the aid of the multiplier 18 the measuring time can be kept short and the desired accuracy nevertheless achieved. In the illustrated embodiment the multiplication factor of the multiplier 18 is 160.

Owing to the provision of the multiplier 18 it is possible in a simple way and with the aid of a small number of components substantially to raise the resolution of instruments of the described type for measuring masses and forces without necessitating modificatins of the mechanical construction of the instrument for achieving short measuring and weighing times. The resolving power and zeroing accuracy can be improved by the employment of the proposed frequency multiplier to a degree of fineness in relation to $d$ that the combined uncertainty of the zero point and of the measurement of mass or force never exceeds the smallest unit $d$ of the digital indication without entailing a longer measuring time for otherwise the same properties of the balance.

We claim:

1. An electronic balance, comprising: a frame; a weighing platform; first and second pretensioned electronically excited transversely vibrating strings; means coupling said strings between said frame and said weighing platform such that the frequency of said first string is increased and the frequency of said second string is decreased as a function of a force exerted on said weighing platform; means for detecting the frequency generated by said first string; phase-locked frequency multiplying means coupled to said detecting means for multiplying the frequency generated by said first string with a predetermined fixed factor in such a manner that the multiplied frequency retains a constant phase relationship with the original frequency generated by said first string; first counting means for detecting and counting a given number of full cycles of the frequency generated by said second string; second counting means for counting the number of full cycles of the multiplied first string frequency during the period of time said given number of full cycles of the second string frequency is counted; and means for displaying the output of said second counting means.

* * * * *